Figure 1:
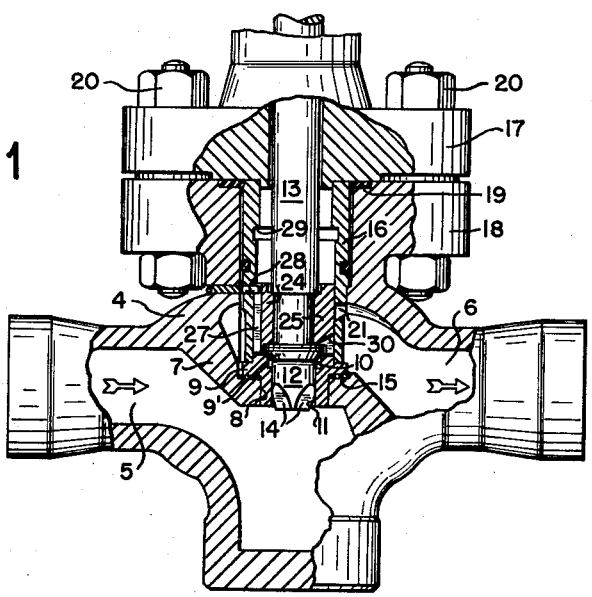

March 17, 1964     J. R. BERMINGHAM     3,125,122

THROTTLING VALVE

Filed Dec. 5, 1961

INVENTOR
John R. Bermingham
BY
ATTORNEYS

United States Patent Office 3,125,122
Patented Mar. 17, 1964

3,125,122
THROTTLING VALVE
John R. Bermingham, Santa Ana, Calif., assignor to Leslie Co., Lyndhurst, N.J., a corporation of New Jersey
Filed Dec. 5, 1961, Ser. No. 157,877
4 Claims. (Cl. 137—625.3)

This invention relates to throttling valves for controlling the flow of fluids and, more particularly, to a dual action tight-closing throttling valve adapted for use in controlling the flow of fluid under high pressure.

In United States Patent No. 2,988,105 there is described a throttling valve characterized by a floating sleeve-like member so positioned as to perform the throttling action of the valve. The valve comprises a body having an inlet side and an outlet side, a valve seat between the inlet and outlet sides, a valve member cooperating with the valve seat, and a valve stem operatively associated with the valve member. The sleeve-like member surrounds the valve stem and is axially locked to the stem so as to be movable axially therewith. A cylinder in the valve body closely surrounds the sleeve-like member and has a port on only one side thereof facing the outlet side of the valve body. The sleeve closes the port when the valve member is within a predetermined distance of its seat and exposes the port as the valve member moves beyond this predetermined distance from its seat. In the copending application, Serial No. 90,088, filed February 17, 1961, there is described and claimed a modification of this type of throttling valve in which the sleeve-like member is composed essentially of a sector portion and a separate guide portion with the sector portion positioned adjacent the port of the cylinder. The thickness of the sector portion of this sleeve-like member is substantially less than the space between the valve stem and cylinder, but the outer surface of the sector portion has a radius of curvature identical with that of the inner surface of the cylinder so as to make a fluid-tight closing of the port.

The above-described throttling valve structure is capable of fine control, but it will be appreciated that, as in the case of other throttling valves, its control is lessened as valve ports become worn. The cooperating portions of the valve are subjected to a considerable amount of wear when the valve is used for handling liquids and dense fluids such as slurries and the like. The amount of wear is accentuated by an increase in pressure drop across the valve with the result that these throttling valves have a shorter life in high pressure systems than in lower pressure systems. In order to prolong the life of a throttling valve, it is common practice to use two separate control valves in series so as to reduce the pressure drop handled by each valve. While this expedient minifies the erosion wear in the valves, it materially increases the cost of the valve installation and often presents serious control difficulties in attempting to regulate the valves so that each handles its proportionate share of the pressure drop while maintaining stability in the pressure-flow system.

I have now devised a modification of the aforementioned throttling valves which accomplishes in a single valve structure the effect of two regulating valves arranged in series. In accordance with the present invention, the valve seat body portion of the valve is provided with a central opening communicating with the valve seat, and the valve stem extends beyond the valve member and into this central opening of the valve seat body portion. The projecting portion of the valve stem is formed with a throttling surface which cooperates with the central opening of the valve seat body portion to provide a throttling valve composed of the previously mentioned valve constituents. Inasmuch as both throttling valve sections are operated by the single valve stem, each valve section assumes a definite proportion of the pressure drop to be handled and both are actuated by a conventional single actuating mechanism.

Figure 2:
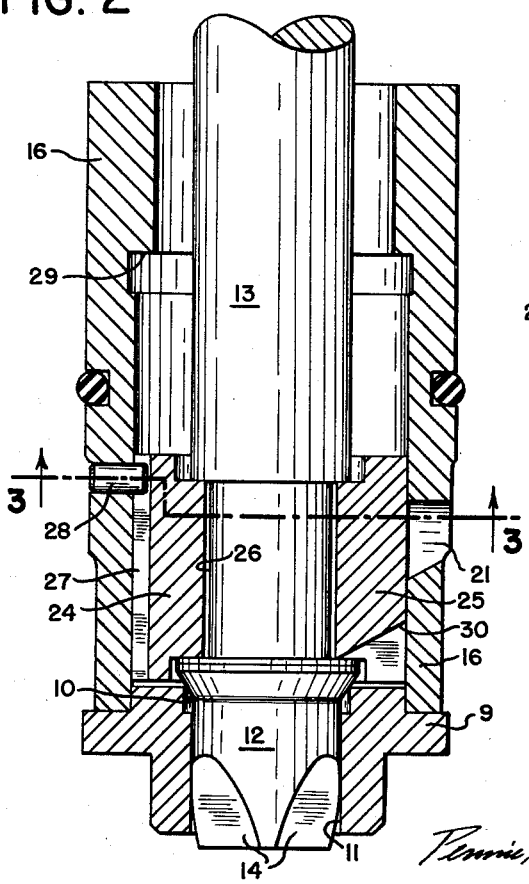
Figure 3:
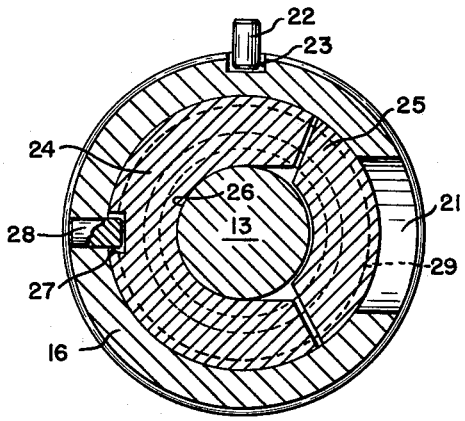

These and other novel features of the throttling valve of the invention will be more readily understood from the following description taken in conjunction with the drawings in which FIG. 1 is a side elevation of the throttling valve with the central portion broken away;

FIG. 2 is a detailed side sectional elevation of the portion of the valve shown broken away in FIG. 1; and FIG. 3 is a section taken along line 3—3 in FIG. 2.

As shown in FIG. 1, a valve body 4 is provided with an inlet side 5 and an outlet side 6. A valve seat body portion 7 is arranged centrally within the valve body and is provided with a passageway 8 communicating between the inlet and outlet sides of the valve body. The passageway 8 is provided with a replaceable valve seat ring 9 having a stepped seating surface 10. The lower body portion of the seat ring 9 extends through the passageway 8. The central bore 11 of the valve seat body portion is occupied by the lowermost tapered end 12 of a valve stem 13, the surface of the tapered end of the valve stem being shaped by bevelled or curved faces 14 (one or more, but advantageously three faces) so that this portion of the valve stem, in conjunction with the central bore 11 and the stepped seating surface 10, forms a first throttling valve for controlling the flow of fluid through the valve seat body portion 8.

The second throttling valve is in the path of fluid flowing through the first throttling valve, the main valve 9' (mounted on the valve stem 13) and toward the outlet side of the valve. This second throttling valve comprises that described in the aforementioned patent or the modification thereof shown in the aforementioned application. The latter structure is shown in the drawings hereof and comprises the valve seat ring 9 sealed to the valve seat body portion 7 through a gasket 15. A cylinder 16 abuts the top surface of the valve seat ring 9 and extends upwardly through the valve body in axial alignment with but spaced outwardly from the valve stem 13. The top of the valve body and of the cylinder 16 is sealed by a bonnet flange 17 which is bolted to a valve body top flange 18 with a gasket 19 therebetween. The cylinder 16 is of such length that when the bonnet bolts 20 are tightened to compress the gasket 19, the lower end of the cylinder 16 engages the top surface of the valve seat ring 9 and presses the latter against the gasket 15.

A port 21 in the wall of the cylinder 16 permits the discharge of fluid into the outlet side 6 of the valve and is held in the direction of the outlet side by a dowel pin 22 which fits into a slot 23 in the cylinder as shown in FIG. 3. The port 21 may be made of a shape or contour required to give any desired throttling characteristic such, for example, as that known as "quick acting," "linear" or "equal percentage."

Control of the flow of fluid through the port 21 in the cylinder 16 is effected by a sleeve-like member comprising a guide portion 24 and a sector portion 25. As can be clearly seen in FIGS. 2 and 3, these two portions surround the valve stem 13 in the nature of a sleeve and are held or locked in axial position with respect to the stem by fitting at least partially within a recess 26 cut in the stem. The guide portion 24 is substantially U-shaped and fits smoothly between the recessed portion of the stem and the inside surface of the cylinder. The sector portion 25 has a thickness somewhat less than the space between the recessed portion of the valve stem and the inner surface of the cylinder so that it is free to move slightly in a direction transverse to the axis of the stem. The outer surface of the sector portion 25 has the same radius of curvature as the inner surface of the cylinder 16 so that these two surfaces make congruent contact when fluid admitted through the valve seat body portion 7 acts upon the inner surface of the sector portion 25 to force it outwardly into contact with the cylinder.

The outer face of the guide portion 24 of the sleeve-like member is provided with a longitudinal keyway 27 which engages the innermost end of a key 28 mounted in the cylinder 16 so that the guide portion will not rotate as it moves axially of the valve body along with the valve stem. An inwardly projecting shoulder 29 in the upper inner surface of the cylinder 16 limits axial movement of the guide portion 24 so that the key 28 will not leave the keyway 27. The legs of the guide portion 24 terminate just short of the side edges of the sector portion 25 so as to permit the aforementioned movement of the sector portion while at the same time preventing a significant degree of rotation of the sector portion around the valve stem. The sector portion 25 is thus maintained in operative position with respect to the cylinder port 21 but is free to move axially of the valve body along with the valve stem 13. The position of the sector portion 25 with respect to the cylinder port 21 determines the throttling effect of this second throttling valve, the throttling taking place at the bottom edge of the sector portion 25, but not at the seating surface of valve seat ring 9. Any erosion or wear of the sector portion can be simply remedied by replacing only the sector portion of the valve.

Control over both throttling valves is exercised by the valve stem 13 which extends through and beyond the valve bonnet 17. The extending portion of the valve stem is operatively connected to conventional valve operating means which may be manual, pneumatic, hydraulic, electric or mechanical. Inasmuch as the two throttling valves of the present invention control the same total pressure drop handled by either of the throttling valves of the aforementioned patent and application, no additional actuator force for the valve stem is required.

By making the overlap of the bore 11 with the untapered portion of the lower valve stem portion of the first throttling valve equal to the overlap between the lower edge of the cylinder port 21 and the edge of throttling surface 30 of the second throttling valve when the valve stem 13 is in its lowermost valve-closed position, each of the two throttling areas of the valve structure will at all times take a specific portion of the total pressure drop to be handled by the valve, and thus the erosion of valve parts in each area is less than with a single throttling area handling the entire drop. The two throttling areas are coordinated by the single valve stem control, and thus by appropriate design of the two throttling areas pursuant to known principles, (i.e. by the shape of the end portion 12 of the valve stem and by the shape of the cylinder port and of the lower edge of the sector portion 25) the two throttling areas can be made to maintain any desired control characteristic regardless of the pressure drop.

I claim:

1. In a throttling valve comprising a valve body having an inlet side and an outlet side, a valve seat between the inlet and outlet sides, a valve member cooperating with the valve seat, a valve stem operatively associated with the valve member, a sleeve-like member surrounding the valve stem and axially locked to the stem so as to be movable axially therewith, and a cylinder in the valve body closely surrounding the sleeve-like member and having a port on only one side thereof facing the outlet side of the valve body, the sleeve member having a lower throttling edge axially aligned with the cylinder port, the improvement which comprises a valve seat body portion having a central passageway communicating between the valve seat and the inlet side of the valve, a second throttling valve seat formed in the central passageway, the valve stem having a portion extending beyond the valve member and into the central passageway of the valve seat body portion, and a throttling surface formed on said extending portion of the valve stem, the overlap between the lower throttling edge of the sleeve and the cylinder port being substantially equal to the overlap between the second throttling valve seat and the upper edge of the throttling surface on the valve stem when the valve stem is in the valve-closed position.

2. In a throttling valve comprising a valve body having an inlet side and an outlet side, a valve seat between the inlet and outlet sides, a valve member cooperating with the valve seat, a valve stem operatively associated with the valve member, a sleeve-like member surrounding the valve stem and axially locked to the stem so as to be movable axially therewith, and a cylinder in the valve body closely surrounding the sleeve-like member and having a port on only one side thereof facing the outlet side of the valve body, the sleeve member having a lower throttling edge axially aligned with the cylinder port, the improvement which comprises a valve seat body portion having a central passageway communicating between the valve seat and the inlet side of the valve, a second throttling valve seat formed in the central passageway, the valve stem having a tapered portion extending beyond the valve member and into the central passageway of the valve seat body portion, and a throttling surface formed on said extending portion of the valve stem, the overlap between the lower throttling edge of the sleeve and the cylinder port being substantially equal to the overlap between the second throttling valve seat and the upper edge of the throttling surface on the valve stem when the valve stem is in the valve-closed position.

3. In a throttling valve comprising a valve body having an inlet side and an outlet side, a valve seat between the inlet and outlet sides, a valve member cooperating wtih the valve seat, a valve stem operatively associated with the valve member, a sleeve-like member surrounding the valve stem and axially locked to the stem so as to be movable axially therewith, and a cylinder in the valve body closely surrounding the sleeve-like member and having a port on only one side thereof facing the outlet side of the valve body, the sleeve member having a lower throttling edge axially aligned with the cylinder port, the improvement which comprises a valve seat body portion having a central passageway communicating between the valve seat and the inlet side of the valve, a second throttling valve seat formed in the central passageway, the valve stem having a tapered portion extending beyond the valve member and into the central passageway of the valve seat body portion, the surface of the tapered portion of the valve stem being provided with a plurality of throttling faces and thus forming a throttling surface on said extending portion of the valve stem, the overlap between the lower throttling edge of the sleeve and the cylinder port being substantially equal to the overlap between the second throttling valve seat and the upper edge of the throttling surface on the valve stem when the valve stem is in the valve-closed position.

4. In a throttling valve comprising a valve body having an inlet side and an outlet side, a valve seat between the inlet and outlet sides, a valve member cooperating with the valve seat, a valve stem operatively associated with the valve member, a sleeve-like member surrounding the valve stem and axially locked to the stem so as to be movable axially therewith, and a cylinder in the valve body closely surrounding the sleeve-like member and having a port on only one side thereof facing the outlet side of the valve body, the sleeve-like member being composed essentially of a sector portion and a guide portion, the sector portion being positioned adjacent the port of the cylinder, the thickness of the sector portion being substantially less than the space between the valve stem and the cylinder within which the sector portion is positioned and the outer surface of the sector portion having a radius of curvature identical with that of the inner surface of the cylinder, the lower edge of the sector portion forming a throttling surface axially aligned with the cylinder port, the improvement which comprises a valve seat body portion having a central passageway communicating between the valve seat and the inlet side of the valve, a second throttling valve seat formed in the central passageway, the valve stem having a portion extending beyond the valve member and into the central passageway of the valve seat body portion, and a throttling surface formed on said extending portion of the valve stem, the overlap between the lower throttling edge of the sleeve and the cylinder port being substantially equal to the overlap between the second throttling valve seat and the upper edge of the throttling surface on the valve stem when the valve stem is in the valve-closed position.

References Cited in the file of this patent

UNITED STATES PATENTS

| | | |
|---|---|---|
| 45,390 | Cresson | Dec. 13, 1864 |
| 1,707,630 | Erceg | Apr. 2, 1929 |
| 1,919,233 | Lee | July 25, 1933 |
| 2,001,487 | Doherty | May 14, 1935 |
| 2,988,105 | Soderberg | June 13, 1961 |